Aug. 17, 1937.                N. H. RICKER                2,089,983
            METHOD AND MEANS OF GEOPHYSICAL PROSPECTING
                    Filed June 9, 1934        2 Sheets-Sheet 1

Norman H. Ricker
                    INVENTOR.
           Jesse R. Stone
BY         Lister B. Clark
                    ATTORNEYS.

Aug. 17, 1937.  N. H. RICKER  2,089,983
METHOD AND MEANS OF GEOPHYSICAL PROSPECTING
Filed June 9, 1934  2 Sheets-Sheet 2

Patented Aug. 17, 1937

2,089,983

UNITED STATES PATENT OFFICE 2,089,983

METHOD AND MEANS OF GEOPHYSICAL PROSPECTING

Norman H. Ricker, Houston, Tex.

Application June 9, 1934, Serial No. 729,933

27 Claims. (Cl. 181—0.5)

This invention relates to a means and method of exploring the regions beneath the surface of the earth for buried geologic structures.

The invention lies within the realm of elastic wave methods and makes use of the propagation of elastic vibrations through the earth, but is radically different from previous elastic wave methods in both principle and practice.

The method makes use of the fact well known to mathematical physicists but, not at all obvious and not previously utilized, that the elastic vibration at a point in the earth due to undamped periodic elastic waves is of a rotating nature such that the point traverses an elliptical path. This matter is treated in a paper by Horace Lamb in the Transactions of the Royal Society, Series A, vol. 203 (1904) beginning on page 1, and particularly the top portion of page 36.

Various devices have been conceived heretofore with a view of locating buried formations, and various methods of determining the location of such formations have been practiced. There are a considerable number of patents already granted on methods utilizing elastic waves. Most of these methods are so called "seismic" methods, wherein a charge of explosive is set off and the vibration of the earth recorded by seismographs at a plurality of locations.

The present invention, however, seeks as an object to simplify the geophysical prospecting by providing a means and method whereby undamped periodic elastic waves, set up in the earth, may be observed as an indication of the geophysical structure in that vicinity.

Another object of the invention is to provide a method of observing and measuring the elastic vibrations of the earth.

Still another object of the invention is to measure the elastic vibration of the earth due to the setting up of a forced elastic vibration of a portion of the earth's surface.

It is another object of the invention to provide a method of measuring the elastic vibration of the earth.

Another object of the invention is to provide an apparatus for setting up undamped periodic elastic vibrations in the earth.

A still further object of the invention is to provide an apparatus for measuring an undamped periodic vibration of the earth with a view of obtaining an indication of the position of a buried geologic structure.

A still further object of the invention is to provide an apparatus for measuring the plane of the vibration ellipse of a periodic elastic vibration as an indication of the sub-surface formation.

A still further object of the invention is to provide a simple and economical apparatus for use in prospecting with elastic waves.

A still further object of the invention is to provide a simple and economical method for use in prospecting with elastic waves.

Still another object of the invention is to take advantage of the phenomena of the elliptical elastic vibration of a particular particle of the earth when the earth is subjected to forced periodic undamped elastic vibrations.

It is a still further object of the invention to provide an apparatus which will indicate the plane of the vibration ellipse of the elastic vibration by determining the direction of its normal which may be read directly on the apparatus.

Other and further objects of the invention will readily be apparent to those skilled in the art to which the invention relates when the following description is considered in connection with the accompanying drawings wherein.

The means and method herein described are different from those heretofore in use and a quite different principle is involved. Previous methods have involved measurement of the time of travel of elastic waves due to sudden shocks as are produced by explosions. Also measurements of the wave forms of the resulting wave trains have been made. On the other hand such of my own methods as have utilized undamped periodic elastic waves have concerned themselves with measurements of intensity and phase of the resulting vibrations.

This invention does not involve the measurement of either amplitude or phase of the vibration of the earth, but recognized the fact that the earth's elastic vibration is of a rotating nature, (a given point in the earth traversing an elliptical path) and proceeds to determine simply the plane in which this vibration ellipse lies.

While this invention does not involve the measurement of amplitudes, or phase of the earth's vibration at various points in the earth, it is to be understood that nothing in this statement is to preclude the measurement of the relative amplitude and phase relation of three orthogonal components of the earth's vibration at a given point in order to determine the direction of the plane of the vibration ellipse; as it is well known that this direction may be calculated from such measurements.

Figure 4:
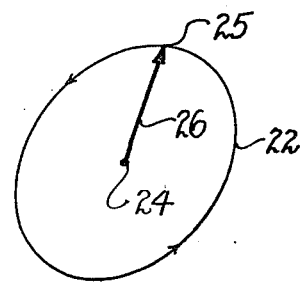
Fig. 4 shows an elliptical path which is described by a point in the vibrating earth.

In order to clarify later remarks I shall state that when an elastic solid body is distorted by impressed forces a point in the undistorted solid moves to a new position due to the distortion. The vector drawn from the original position of the point to the new position is called the "elastic displacement vector." In Fig. 4 the undisturbed position of the point in the solid body is shown at 24. One position of the displaced point is shown at 25, the elastic displacement vector at that particular instant being shown at 26. In the course of changing time the displaced point traverses the elliptical path 22 and thus the elastic displacement vector may be described as being of a rotating nature.

In order to explain my method I shall first describe briefly one manner in which the method is utilized in practice. I first set up a forced vertical simple harmonic motion of the earth's surface at a selected point on the surface of the earth. If the earth's structure is homogeneous or if it consists of parallel horizontal beds whose variation in density and elastic properties occurs only in a vertical direction then the resulting wave system will possess symmetry about a vertical axis passing through the point at which the forced vibration is applied, and the vibration ellipses of the earth's elastic vibratory motion will all lie in the family of vertical planes passing through the axis of symmetry. The vibration ellipses thus define this family of surfaces. If now the earth's subsurface is non-homogeneous or the beds are distorted from their parallel horizontal position, being perhaps arched or faulted, the symmetry will be destroyed and the surfaces defined by the vibration ellipses will be warped from their normal configuration. This warping of the surfaces defined by the vibration ellipses is caused by the geologic structure beneath the earth's surface and can be used to determine the position and form of this geologic structure. By determining a direction characteristic of the wave system such as the normal to the plane of the vibration ellipse at any point in the earth I thereby determine the normal to the surface through that point determined by the vibration ellipses. Observations are generally confined to the surface of the earth but may also be made in mines, wells and other cavities beneath the earth's surface.

Thus broadly this invention is based upon the theory that the planes of the vibration ellipses of the earth's vibratory motion define a family of surfaces on which the vibration ellipses lie and to which the planes containing each independent ellipse are tangent. This family of surfaces (which are solutions of Laplace's equation) would possess a normal symmetrical form in homogeneous earth, and, where the earth is non-homogeneous, there will be a warping of the surfaces, and I contemplate the determination of the warping of these surfaces from their normal symmetrical form as an indication of the non-uniform earth structure which has produced such warping.

The present invention then contemplates broadly the idea of imparting a sustained periodic vibration to the earth and determining the plane of the vibration ellipse of the elastic vibration which results at various points in the earth due to this sustained periodic vibration.

Figure 3:
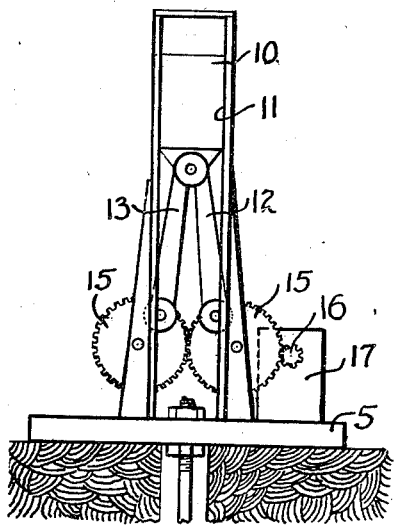
Fig. 3 is a side elevation of one form of apparatus which may be used in setting up undamped periodic elastic waves in the earth.

One form of apparatus for imparting the sustained periodic vibration to the earth is illustrated in Fig. 3. This apparatus consists of a frame 5 which is disposed on the earth's surface and may be anchored thereto in any desired manner. In Fig. 3, however, an anchor post 6 has been provided whose lower end is anchored to the earth and is here shown as imbedded in a body of concrete or other suitable material 7 in a bore 8 which extends into the earth. In this manner the frame or foundation 5 can be suitably anchored, so that it will withstand enormous vibrations and impart such vibrations to the earth.

In order to set up the vibrations a mass 10 of considerable size has been mounted for reciprocation in the trackway 11 by means of the pitman arms 12 and 13. These arms are pivoted at one end to the mass 10 and at the opposite ends to drive gears 15. These gears in turn are arranged for rotation by means of a pinion 16 which is driven by a suitable source of power 17. This source of power may be an electric motor or internal combustion engine of any type, so long as it is capable of developing sufficient power to cause rotation of the gears and reciprocation of the mass 10.

It is obvious that when this mass 10, which will be of considerable size, is reciprocated, the force of reversing the direction of movement thereof will impart a mechanical vibration to the earth and elastic waves will travel outward from the point where the apparatus is anchored. Because of this, the apparatus of Fig. 3 will be designated as a "wave generator". The frequency of these vibrations may be varied, depending upon conditions and circumstances, but a frequency of substantially five vibrations per second enables one to make satisfactory observations of the resultant waves. The number of vibrations per second may be varied, however, in accordance with circumstances and conditions which are encountered, in order to obtain a satisfactory operation of the device. It is contemplated that the mass 10 may be of any desired size in order to operate satisfactorily in connection with the circumstances encountered. As an example a mass weighing about one or two tons may be used and this mass may be arranged for a reciprocating movement of, say ten or twelve inches. It is anticipated that a frequency range of from, say one cycle per second up to, say thirty cycles per second should be satisfactory in order to obtain a suitable undamped periodic wave system which may easily be detected. I do not, however, wish to be limited to any definite frequency range.

It is obvious that the length of travel or stroke of the mass 10 can be varied by varying the size of the gears and other parts of the apparatus. As seen in Fig. 3, the mass 10 will preferably operate along a vertical line at its point of location so that the earth's motion at that point will be perpendicular to the surface of the earth. The apparatus is thus shown balanced to prevent side thrusts so that the forces will always be perpendicular to the earth's surface. However, I do not wish to be limited to such an arrangement. This arrangement, however, is especially claimed in this invention. While one type of the apparatus has been shown and described, it seems obvious that various devices may be constructed for the purpose of wave generation.

Figure 1:
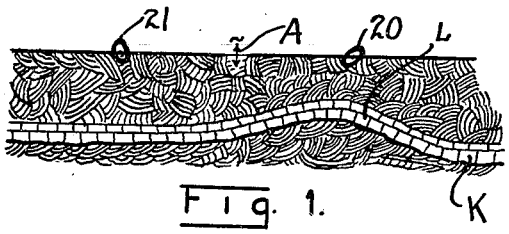
Fig. 1 is a vertical section of a portion of the earth in a region which is being prospected.
Figure 2:
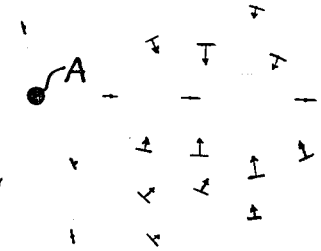
Fig. 2 is a plan view showing a diagrammatic arrangement for plotting the readings obtained when surveying a section such as shown in Fig. 1.

In Figs. 1 and 2 the position of the wave generator is shown at A.

Figure 5:
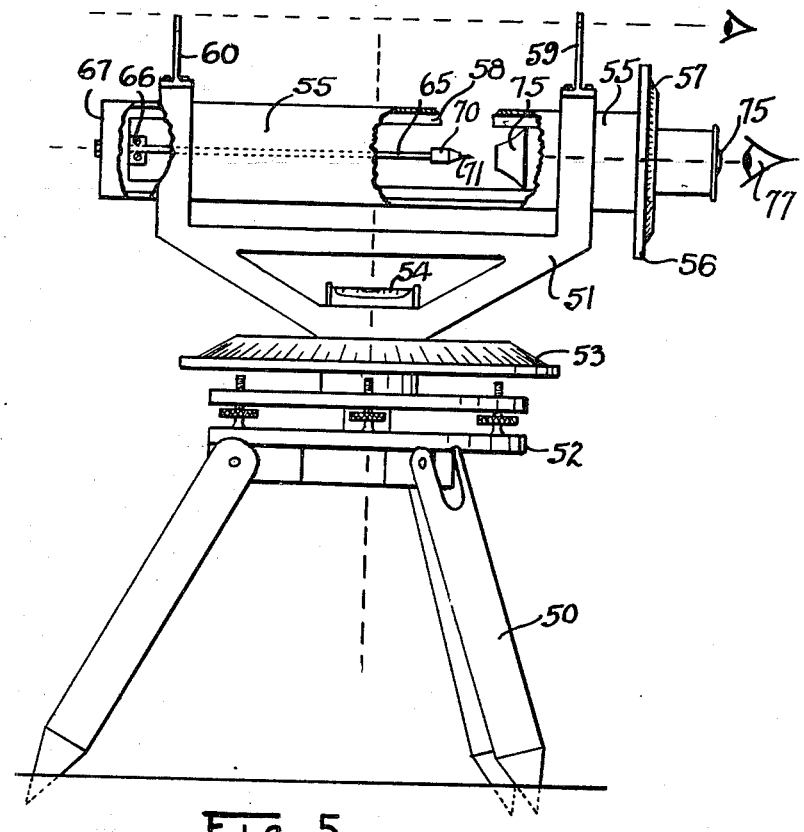
Fig. 5 shows an elevation of one form of apparatus which may be used for detecting and measuring the plane of the vibration ellipse of the earth's vibration, with certain parts of the device cut away to illustrate the construction thereof.

In Fig. 5 is shown an instrument 50 for determining the plane of the vibration ellipse of the earth's vibratory motion. The instrument consists of a frame 51 which is rotatably mounted upon the tripod 52 and is provided with a scale 53 to indicate orientation relative to rotations about the vertical axis. A level is included in the instrument at 54, while the main barrel 55 houses the mechanism for determining the tilting of the plane of the vibration ellipse. This construction includes the barrel 55 which is mounted in the frame 51 and is provided with an index on the flange 56. A sleeve 58 is rotatably mounted in the barrel 56 and rotations of this sleeve about the horizontal axis may be determined by means of the scale 57 which is carried thereby. A sighting device, one form of which is shown by 59 and 60, is provided on the frame in order that the direction of the device may be oriented with respect to the line running from the wave generator to the instrument or other directions or survey lines. It is to be understood that other than optical methods may, however, be used.

Figure 6:
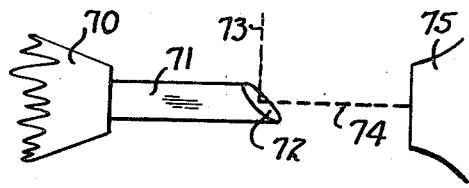
Fig. 6 is an enlarged detail of the end of the vibrating member which is shown in the apparatus of Fig. 5.

The sleeve 58 contains a flat strip or reed 65 fixed at 66 to the end 67 of the sleeve 58. This reed will have considerable width as compared with a much lesser thickness, so that it will vibrate along a normal to the plane of its width and length. A small mass 70 is positioned on the end of the reed and a projecting needle 71 extends beyond the mass 70. The mass 70 and needle 71 are seen in enlarged form in Fig. 6. The end of the needle 71 is beveled at 72 and polished in order to reflect skylight which will travel along the line 73. This beam will be reflected from the surface 72 along the path 74 to be received in the microscope 75. The reed may be tuned to the frequency of the wave system being used in order to secure high sensitivity.

Fig. 5 diagrammatically illustrates the eye 77 as viewing the path of vibration of the needle 71 in accordance with the vibration of the earth's surface upon which the tripod rests.

In practice the tripod is set up at the location where the position of the vibration ellipse is to be determined. The instrument is then levelled in much the same manner as is done with ordinary surveying instruments and the sights trained upon, say the wave generator and the angular scale 53 read. Upon looking into the eyepiece the needle will in general be observed to be vibrating, showing that there is a component of the earth's vibration perpendicular to the plane of the reed. If now the instrument is rotated about the vertical axis and the sleeve about the horizontal axis a setting may be found at which the needle no longer vibrates. In this position the normal to the plane of the reed coincides in direction with the normal to the plane of the vibration ellipse of the earth's vibratory motion. The scales 53 and 57 are then read.

The difference between the initial and final readings of scale 53 gives the "strike" of the plane of the vibration ellipse with respect to the line joining the instrument with the wave generator and the reading of scale 57 gives the tilt or "dip" of the plane of the vibration ellipse. Thus the two angular quantities necessary for determining the plane of the vibration ellipse are read directly on the instrument.

In practicing my method I then proceed as follows. At a selected point in the region to be prospected I first set up my wave generator and set the mass into reciprocating motion. This causes a system of undamped periodic elastic waves to proceed through the earth from the selected point. I then set up at another selected point my receiving instrument; making sure that the legs of the tripod make firm contact with the earth and then level the instrument. I then rotate the instrument about its vertical axis until the sighting device bears upon the wave generator and I then read the scale 53. I then look into the eyepiece and observe the end of the needle which is attached to the vibratable reed. It will in general be seen to be vibrating. I then rotate the instrument about the vertical axis and rotate the sleeve about the horizontal axis until the position is found at which the needle no longer vibrates. The plane of the reed now lies in the plane of the vibration ellipse of the earth's vibratory motion. I then read scale 53 and scale 57. In this way I obtain the angle which the strike of the plane of the vibration ellipse makes with the line joining the instrument with the wave generator from the readings of scale 53, and from scale 57 I obtain the angle of tilting of the plane of the vibration ellipse from the vertical. The scale 57 is so set that it reads zero when the plane of the reed is vertical so that the reading of scale 57 gives directly the angular departure of the plane of the vibration ellipse from the vertical.

If the earth is homogenous or consists simply of parallel horizontal beds of uniform density and elasticity throughout any given bed, then the vibration ellipses should lie everywhere in vertical planes passing through the wave generator. Any departures from these positions are readily detected and measured, by the instrument. Additional observations with the receiving instrument Fig. 5 may be taken at various selected stations within the reliable operating radius from the wave generator and sufficiently removed from the wave generator so that the deep traveling waves can be readily observed and will not be masked by the direct waves emanating from the source. In plotting up my data I secure a map of the area being prospected and mark thereon the position of the wave generator. At points corresponding to the various observation stations I draw a short line centered at the observation point and running in a direction which represents the intersection of the plane of the vibration ellipse with the earth's surface. I then draw a small arrow beginning at the observation point and running perpendicular to the first line, of length proportional to the amount of the angular displacement of the plane of the vibration ellipse from the vertical. Such a chart is shown in Fig. 2. I then extend the survey by moving my wave generator to a new location and repeating the above described procedure. The buried structure is then located by studying the data as plotted on the chart, noting the regions of large anomaly and the directions and magnitudes of the arrows.

What is claimed is:

1. A method of prospecting for buried mineral deposits comprising setting up an elastic wave system which would possess symmetry about a vertical axis were the earth homogeneous, making observations at a series of correlated points of the position in space of the plane of the vibration ellipse of the resulting earth's vibration, and correlating the data so obtained.

2. A method of prospecting for buried mineral deposits comprising imparting periodic continuous vibrations to the earth along a normal to the earth's surface, making observations at a series of correlated points of the position in space of the plane of the vibration ellipse of the resulting earth's vibration, noting the deviation of the plane of this vibration ellipse from the vertical plane passing through the point at which the position of the vibration ellipse is determined, and coordinating the data so obtained.

3. A method of prospecting for buried mineral deposits comprising setting up an undamped periodic elastic wave system in such a manner that it would have axial symmetry about a line perpendicular to the earth's surface were the earth homogeneous, making observations of the plane of the vibration ellipse of the resulting earth's vibration to determine the distortion of the wave system from axial symmetry due to the earth's sub-surface not being homogeneous, and coordinating the data so obtained.

4. A method of subsurface prospecting to determine the non-homogeneous nature of the earth's sub-surface, including setting up an undamped periodic elastic wave system in the earth's formation which wave system would possess axial symmetry about a central vertical axis were the earth's sub-surface elastically symmetrical about such axis and taking observations of the plane of the vibration ellipse of such elastic wave system at predetermined positions about such central axis.

5. A method of charting the elliptical vibration of a point in the earth consisting in determining the plane of the vibration ellipse of the elliptical vibration.

6. A process of determining the location of underground formations including passing an elastic wave into the earth and observing the location of the normal to the plane of the vibration ellipse of the vibration thus set up.

7. A geophysical prospecting method including the use of undamped periodic elastic waves passing through the earth, wherein the elastic displacement vector of the resultant earth vibration is of a rotating nature, including the steps of setting up such undamped periodic waves, observing such waves, and coordinating the data so obtained.

8. A geophysical prospecting method comprising setting up an undamped periodic elastic wave system in the earth and making observations at a series of correlated points of the rotating elastic displacement vector of the earth's resulting vibratory motion, and coordinating the data so obtained to determine the existence and location of geologic structures.

9. A geophysical prospecting method comprising setting up an undamped periodic elastic wave system in the earth and making observations at a series of correlated points of the plane of the vibration ellipse of the earth's resulting vibratory motion and coordinating the data thus obtained to determine the existence and location of geologic structures.

10. A geophysical prospecting method comprising setting up an elastic wave system in the earth and making measurements at various points in the earth of the plane of the vibration ellipse of the resulting elliptically polarized vibration and correlating the data so obtained.

11. A geophysical prospecting method comprising setting up a continuous periodic forced vibration in the earth and charting the surfaces defined by the vibration ellipses of the said vibration in the earth to detect distortions of said surfaces by the geologic structures beneath the earth's surface to obtain a knowledge of said geologic structures.

12. In a method of geophysical prospecting wherein a periodic forced vibration is imparted to the earth to cause an elliptical polarization of the resulting vibration, the step of directly determining the plane of the vibration ellipse of such resulting vibration as an indication of the earth's formation.

13. A geophysical prospecting method including determining the plane of the vibration ellipse of the elliptically polarized elastic vector displacement due to an elastic wave system passing through the earth.

14. A geophysical prospecting method in which undamped elastic vibrations have been set up in the earth including manipulating a tuned elastic member in contact with the earth in such a manner as to determine the angular position of said member at which it does not vibrate.

15. An apparatus for setting up continuous periodic elastic waves in the earth comprising a heavy inertial mass, means for restraining the motion of said inertial mass to a direction perpendicular to the surface of the earth, and means for setting up periodic reactive forces between said inertial mass and the surface of the earth.

16. An instrument for determining the angular position of the plane of the vibration ellipse of a mechanical vibration comprising a support, a frame arranged for rotation on said support about a vertical axis, an angular scale and index on said support and frame, a member carried by said frame and arranged for rotation with respect to said frame about a horizontal axis, an angular scale and index on said frame and member, a part carried by said member, said part being capable of linear vibration with a single degree of freedom with respect to said member and means for observing the vibration of said part.

17. In combination a generator of periodic elastic waves in the earth, and an instrument for determining at a remote point the plane of the vibration ellipse of the elliptical earth motion of a point in the earth in the vicinity of exploration.

18. An apparatus for setting up mechanical vibrations in the earth such that the resulting vibration of the earth at the position of the apparatus will have but a single spatial component and that component perpendicular to the earth's surface, including means to impart the vibration to the earth, and means to actuate said first means.

19. A means for prospecting with undamped periodic elastic waves including a device to set up waves of constant frequency, and a receiving device tuned to the constant frequency of the vibration of the waves thus set up.

20. In a method of prospecting with undamped periodic elastic waves set up by a source at a constant frequency, the step of detecting only the waves of the frequency set up as an indication of the nature of the earth's subsurface.

21. In combination a generator of periodic elastic waves to set up a wave system in the earth, and an instrument for determining at a remote point a direction characteristic of the wave system set up by said generator.

22. A process of determining the location of underground formations including passing a periodic elastic wave into the earth and observing a direction characteristic of the resultant vibratory earth motion.

23. In an elastic wave system to be propagated through the earth from a source point in the earth, for use in geophysical prospecting, the step of oscillating the source point with simple harmonic motion along a line perpendicular to the earth's surface.

24. A method of geophysical prospecting including the steps of setting up an undamped periodic elastic wave system in the earth possessing symmetry about a central vertical axis were the earth elastically homogeneous, and making measurements to determine the departure of the elastic wave system from axial symmetry due to non-homogeneous geologic formations.

25. A method of geophysical prospecting including the steps of setting up an undamped periodic elastic wave system in the earth in such a manner that the elastic wave system would possess symmetry about a central vertical axis were the earth elastically homogeneous, making measurements of the elastic wave system at points on the earth's surface removed from the central vertical axis, and coordinating the data thus obtained to determine the structural nature of the earth's subsurface.

26. A method of geophysical prospecting including the steps of setting the earth into a periodic forced vibration at a selected excitation point, and making observations of the resulting earth vibration at points sufficiently removed from said excitation point so that the deep traveling waves will not be masked by the direct waves resulting from the periodic forced vibration.

27. A method of geophysical prospecting including the setting up of an undamped periodic elastic wave system which would possess symmetry were the earth homogeneous, and making measurements to detect departures of the actual wave system from such symmetry as an indication of the buried geologic structures.

NORMAN H. RICKER.